US008401333B2

(12) United States Patent
Miyakawa et al.

(10) Patent No.: US 8,401,333 B2
(45) Date of Patent: Mar. 19, 2013

(54) IMAGE PROCESSING METHOD AND APPARATUS FOR MULTI-RESOLUTION FEATURE BASED IMAGE REGISTRATION

(75) Inventors: Ayu Miyakawa, Kawasaki (JP); Masayoshi Shimizu, Kawasaki (JP); Yasuhiko Nakano, Kawasaki (JP); Yuri Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1137 days.

(21) Appl. No.: 11/949,463

(22) Filed: Dec. 3, 2007

(65) Prior Publication Data
US 2008/0232715 A1    Sep. 25, 2008

Related U.S. Application Data

(63) Continuation of application No. PCT/JP2005/010523, filed on Jun. 8, 2005.

(51) Int. Cl.
*G06K 9/36* (2006.01)
(52) U.S. Cl. ...................................... 382/284
(58) Field of Classification Search .................. 382/284, 382/394–297; 348/584, 586, 598, 600, 589, 348/594, 595, 601; 345/115; 358/450
See application file for complete search history.

(56) References Cited

U.S. PATENT DOCUMENTS

| | | | | |
|---|---|---|---|---|
| 6,128,416 A * | 10/2000 | Oura | | 382/284 |
| 6,665,440 B1 * | 12/2003 | Zhang et al. | | 382/209 |
| 6,714,689 B1 * | 3/2004 | Yano et al. | | 382/284 |
| 6,795,567 B1 * | 9/2004 | Cham et al. | | 382/103 |
| 7,583,835 B2 * | 9/2009 | Leroux | | 382/153 |
| 7,773,140 B2 * | 8/2010 | Nakano et al. | | 348/312 |
| 7,860,302 B2 * | 12/2010 | Sato et al. | | 382/154 |
| 2008/0152225 A1 * | 6/2008 | Iwamoto | | 382/190 |
| 2008/0187234 A1 * | 8/2008 | Watanabe et al. | | 382/254 |

FOREIGN PATENT DOCUMENTS

| | | |
|---|---|---|
| JP | 3-99379 | 4/1991 |
| JP | 7-85246 | 3/1995 |
| JP | 7-200778 | 8/1995 |
| JP | 8-87585 | 4/1996 |
| JP | 8-147473 | 6/1996 |
| JP | 2652070 | 5/1997 |
| JP | 10-83442 | 3/1998 |

(Continued)

OTHER PUBLICATIONS

Hsu et al, Multiresolution Feature-Based Image Registration, in Visual Communications and Image Processing 2000, Proceedings of SPIE vol. 4067 (2000),pp. 1490-1498, Perth, Australia, Jun. 20-23, 2000.*

(Continued)

*Primary Examiner* — Andrae S Allison
(74) *Attorney, Agent, or Firm* — Staas & Halsey LLP

(57) ABSTRACT

When different images are combined, the corresponding parts are to be aligned accurately. To thus combine images, the feature point of each pixel is calculated from each original image using an operator (filter). The pixels are divided into blocks that the resolution matches that of the reduced image of each original image, and an expectation value map for registering the expectation value of the feature point of each block is drawn. Feature points are expected from the expectation values which the expectation value map holds, and reduced images are superposed one on the other. The feature points of the original images corresponding to the feature points between which the correspondence is derived from the reduced images are extracted, and the original images are superposed one on the other using the extracted feature points.

19 Claims, 20 Drawing Sheets

FOREIGN PATENT DOCUMENTS

| | | |
|---|---|---|
| JP | 2001-34756 | 2/2001 |
| JP | 2004-343483 | 12/2004 |

OTHER PUBLICATIONS

Le Moigne et al, An Automated Parallel Image Registration Technique Based on the Correlation of Wavelet Features, IEEE Transactions on Geoscience and Remote Sensing, vol. 40, No. 8 Aug. 2002.*

L. Falkenhagen, "Hierarchical Block-Based Disparity Estimation Considering Neighbourhood Constraints", International workshop on SNHC and 3D Imaging, Sep. 5-9, 1997, Rhodes, Greece.*

Bugeau, A.; Perez, P.; , "Detection and segmentation of moving objects in highly dynamic scenes," Computer Vision and Pattern Recognition, 2007. CVPR '07. IEEE Conference on , vol., no., pp. 1-8, Jun. 17-22, 2007.*

Maintz J.B. et al., "Registration of SPECT and MR brain images using a fuzzy surface", Proceedings of the SPIE, vol. 2710, Jan. 1, 1996, pp. 821-829.

European Office Action dated May 19, 2010 and issued in corresponding European Patent Application 05 748 563.3.

Hsu C-T et al., "Multiresolution Feature-Based Image Registration", Proceedings of the SPIE—The International Society for Optical Engineering, vol. 4067, no. Part 01-03, Jun. 20, 2000, pp. 1490-1498.

J-Y. Boughet, "Pyramidal Implementation of the Lucas Kanade Feature Tracker: Description of the algorithm" Intel Corporation, Microprocessor Research Labs, Technical Report, 1999, pp. 1-9.

Hsu C-T et al., "Mosaics of video sequences with moving objects" Signal Processing, Image Communication, vol. 19, No. 1, Jan. 1, 2004, Elsevier Science Publishers, Amsterdam, NL, pp. 81-98.

European Search Report mailed Jul. 21, 2009 and issued in corresponding European Patent Application 05748563.3.

European Office Action issued on Sep. 29, 2009 in corresponding European Patent Application 05 748 563.3.

International Search Report (PCT/ISA/210) mailed Jul. 12, 2005 in connection with the International Application PCT/JP2005/010523.

* cited by examiner

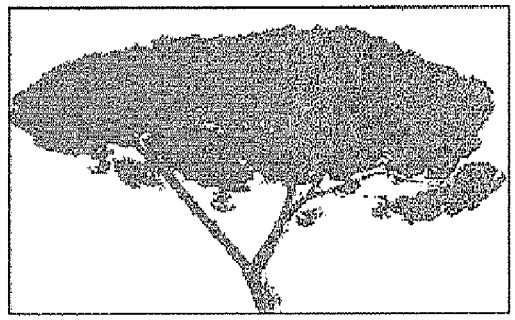
(a)
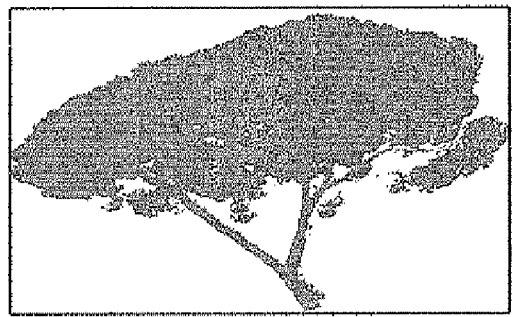
(b)
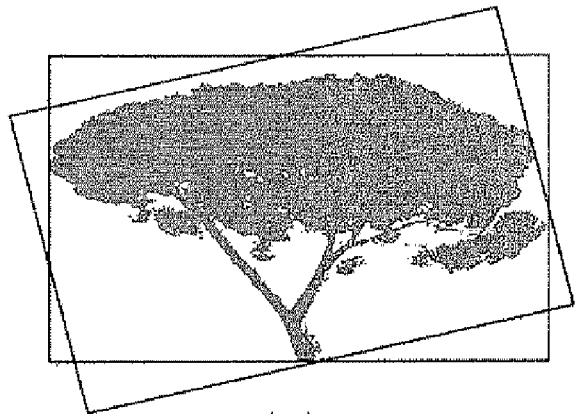
(c)
FIG. 1

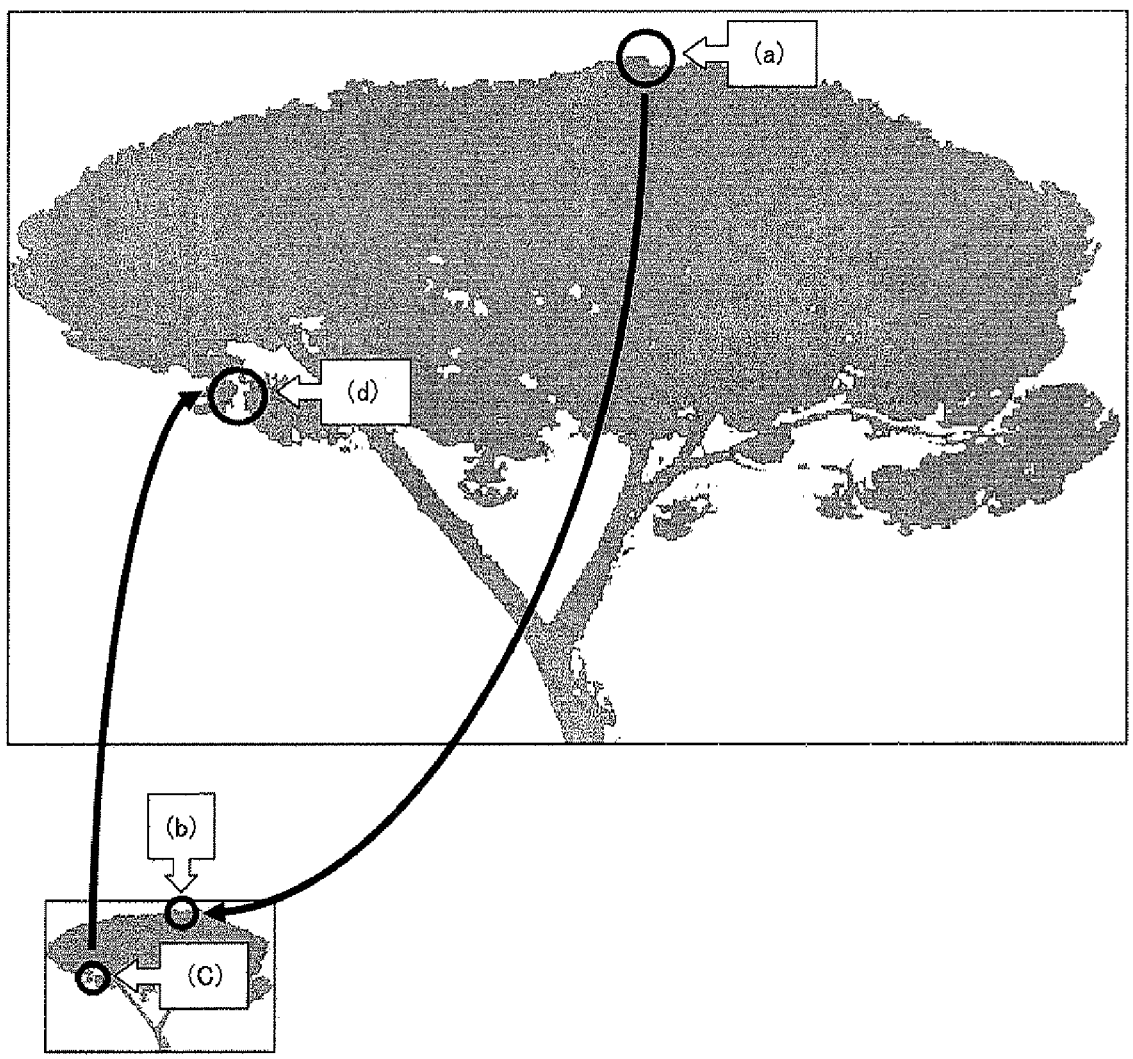
F I G. 6

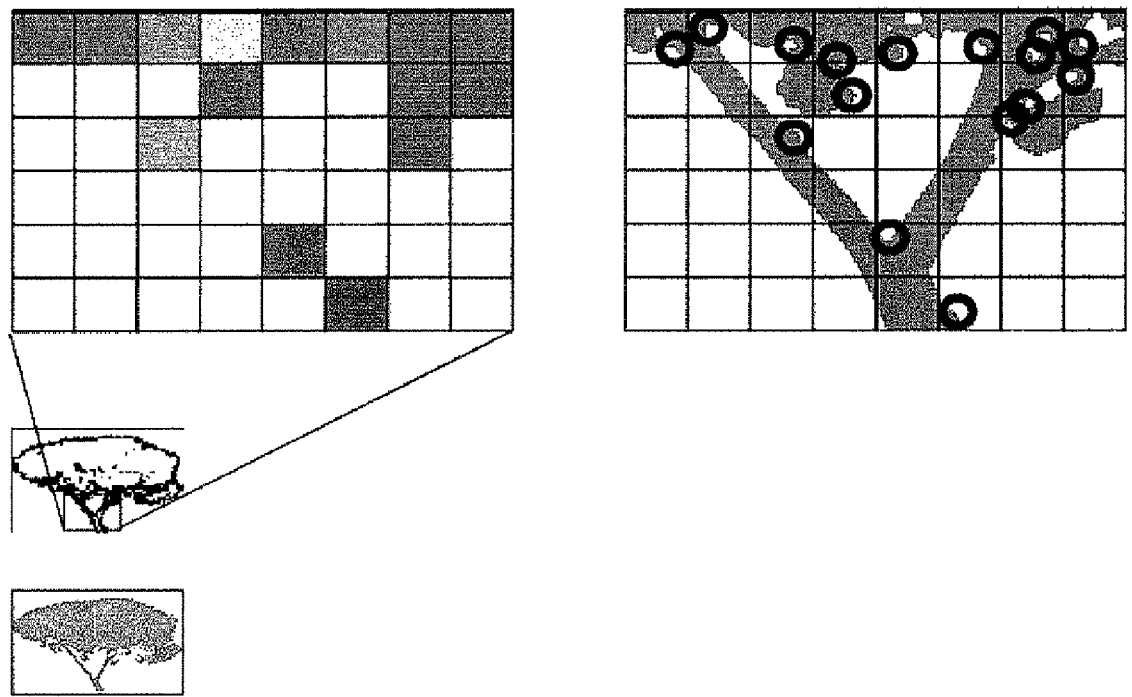
F I G. 8

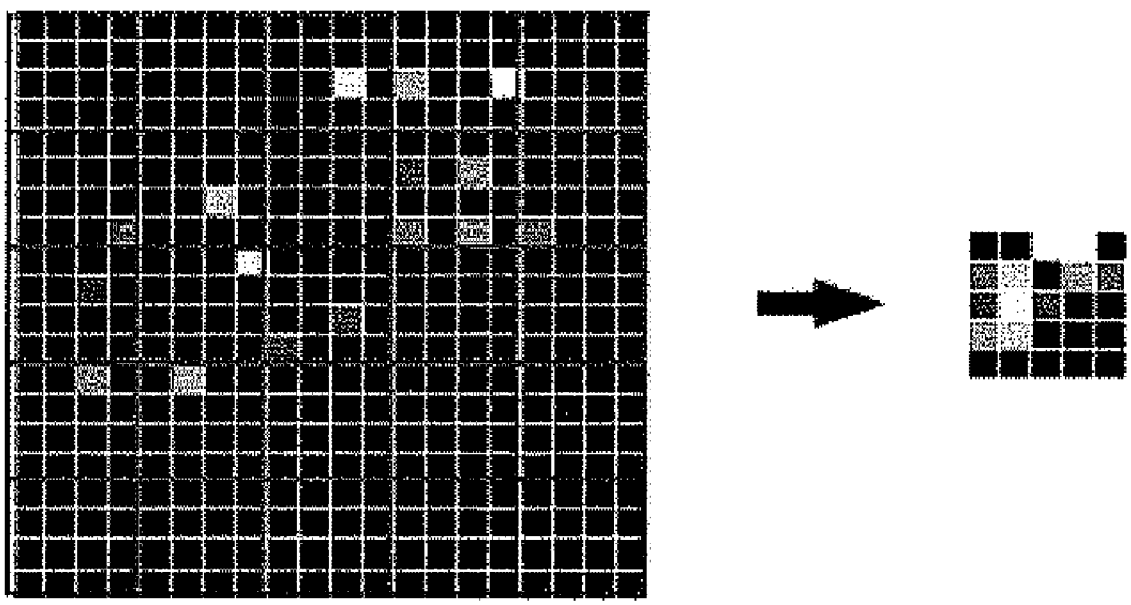
F I G. 9

| $I_{3,-2}$ |  | $I_{1,-2}$ |  | $I_{2,-2}$ |
|---|---|---|---|---|
|  | $I_{3,-1}$ | $I_{1,-1}$ | $I_{2,-1}$ |  |
| $I_{0,-2}$ | $I_{0,-1}$ | $I_{0,0}$ | $I_{0,1}$ | $I_{0,2}$ |
|  | $I_{2,1}$ | $I_{1,1}$ | $I_{3,1}$ |  |
| $I_{2,2}$ |  | $I_{1,2}$ |  | $I_{3,2}$ |

F I G.   1 2

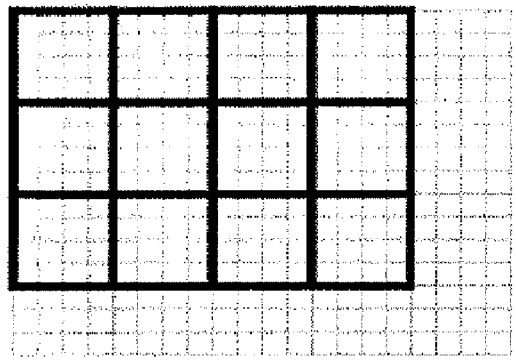 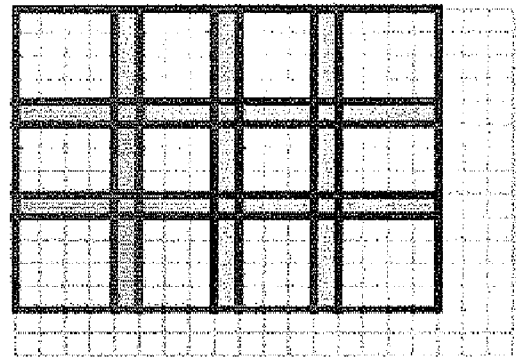
(a) (b)
F I G. 16

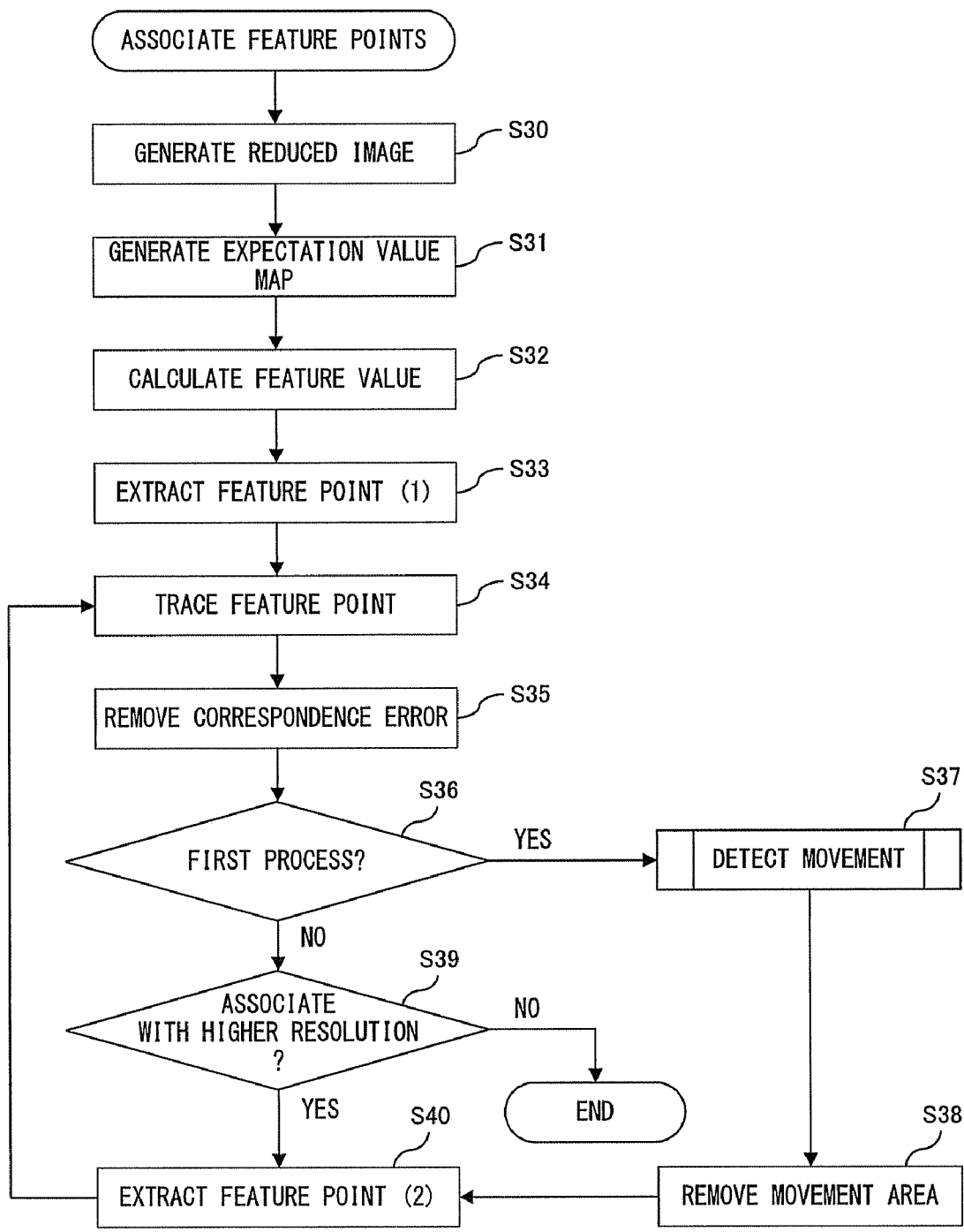
F I G. 1 8

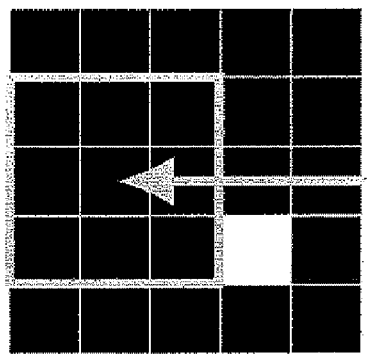
TARGET POINT: BLACK AS IS
(a)
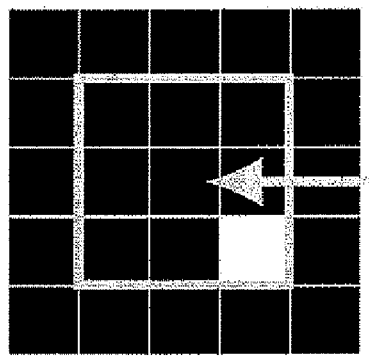
TARGET POINT: TURN TO WHITE
(b)
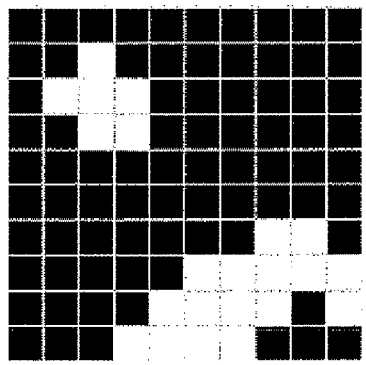 → 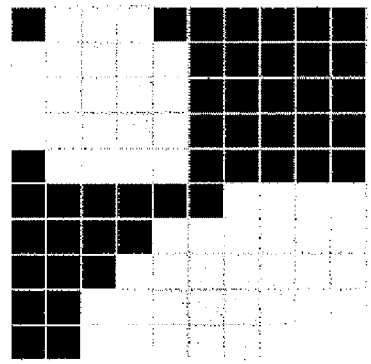
(c)
FIG. 20

IMAGE PROCESSING METHOD AND APPARATUS FOR MULTI-RESOLUTION FEATURE BASED IMAGE REGISTRATION

CROSS REFERENCE TO RELATED APPLICATION

This application is a continuation of PCT application of PCT/JP2005/010523, which was filed on Jun. 8, 2005.

BACKGROUND OF THE INVENTION

1. Field of the Invention

The present invention relates to an image processing apparatus capable of associating a subject at a high speed when a plurality of images are combined.

2. Description of the Related Art

The conventional image processing method is described below with reference to FIGS. 1 through 5.

For example, assume that the images as shown in FIG. 1 (a) and FIG. 1(b) are superposed one on the other as shown in FIG. 1 (c). In this case, as shown in FIG. 2, the feature point of one image is extracted, the other image is searched for the feature point, and the subjects are associated with each other. At this time, if the feature point is traced using the original image as is, it is necessary to search for the feature points of the entire original image as shown in FIG. 3. Therefore, the search range is large. A common method of avoiding this problem is to first associate feature points at low resolution as shown in FIGS. 5 ((1a) and (1b)), raise the resolution step-wise with the feature point search range limited at an image with higher resolution (FIG. 5 (2a) through (3b)). The patent document 5 describes a method of raising the resolution with the search range limited sequentially using results obtained with images with lower resolution to combine two images partly overlapping each other. There is a method of extracting a feature point by first extracting a feature point from an original image of high resolution and obtaining a point corresponding to the feature point as a feature point of a reduced image, and a method of extracting a feature point from a reduced image.

FIG. 4 shows the concept of an image including a feature point and an image including no feature point. A feature point refers to a point at which edges cross each other or at which curvature of an edge is large as indicated by the arrows shown in FIGS. 4 (a) and (b). Since FIG. 4(c) and FIG. 4(d) do not include a point of high curvature or a point at which edges cross each other, they do not include a feature point. There are operators such as Moravec, Harris, SUSAN, etc. and a KLT proposed for extracting the above-mentioned feature points. Refer to the following patent documents 1 through 6 for operators.

It is necessary to associate images with each other with high accuracy when a panoramic image is generated, the resolution of an image is enhanced, noise is to be reduced, etc. by combining a plurality of images. However, with increasing complexity of arithmetic operations on multi-pixel images to be processed after the improvement of performance of a digital camera etc., a high-speed processing method is demanded.

The following patent documents relate to the conventional image combining methods. The patent document 1 discloses a technique of matching images by a wavelet variable template matching method. The patent document 2 discloses a camera shake correcting method using low-resolution images. The patent document 3 discloses a technique of extracting and associating feature points of graphic data with each other at each hierarchical level corresponding to the resolution of a display device when the graphic data is displayed. The patent document 4 discloses a technique of an image reconstruction apparatus using the positions and shapes of feature points having different resolutions.

Patent Document 1: Japanese Patent Application Publication No. 2001-34756
Patent Document 2: Japanese Patent Application Publication No. 2004-343483
Patent Document 3: Japanese Patent Application Publication No. H8-87585
Patent Document 4: Japanese Patent No. 2652070
Patent Document 5: Japanese Patent Application Publication No. H10-83442
Non-patent Document 1: Bruce D. Lucas and Takeo Kanade: "An Iterative Image Registration Technique with an Application to Stereo Vision", International Joint conference on Artificial Intelligence, pages 674-679, 1981.
Non-patent Document 2: Carlo Tomasi and Takeo Kanade: "Detection and Tracking of Point Features.", Carnegie Mellon University Technical Report CMU-CS-91-132, April 1991.
Non-patent Document 3: Hideyuki Tamura: "Computer Image Processing", Ohmusha, ISBN 4-274-13264-1
Non-patent Document 4: C. Harris and M. Stephens: "A combined Corner and Edge Detector", Proc. Alvey Vision Conf. pp. 147-151, 1988
Non-patent Document 5: S. M. Smith, J. M. Brady: "SUSAN-A New Approach to Low Level Image Processing"
Non-patent Document 6: Richard Hartley, Andrew Zisserman: "Multiple View Geometry in Computer Vision" Campridge Univ Pr (Txp); ISBN: 0521540518; 2nd (2004 Apr. 1)

SUMMARY OF THE INVENTION

The present invention aims at providing an image processing apparatus capable of associating images with each other at a high-speed with high accuracy although the images are multi-pixel images.

The image processing apparatus according to the present invention combines two images by superposing one on the other, and includes: a reduced image generation device for generating reduced images from original images to be superposed one on the other; an expectation value map generation device for calculating a feature value using a predetermined operator filter for each pixel of an original image of an image to be superposed, dividing a feature value of each pixel into blocks corresponding to the resolution of the reduced image, and generating an expectation value map in which an expectation value of a feature value is registered; a feature point extraction device for extracting a feature point from the expectation value registered in the expectation value map; and a superposition device for superposing reduced images of original images to be superposed one on the other using the feature points, extracting a feature point in an original image corresponding to the feature point from a result of the superposition, and superposing the original images one on the other.

According to the present invention, an expectation value map is generated on the basis of an original image. Therefore, the map includes the information about the original image. The resolution of the expectation value map corresponds to a reduced image, and a feature point is extracted using the image. Therefore, the feature point of the reduced image can be extracted with the information about the original image maintained, and no feature point is lost between the original image and the reduced image. Although control is passed from a reduced image to an original image, the correspondence between the original image and the reduced image can be detected only by searching the surroundings of the original image corresponding to the feature point of the reduced image, thereby reducing the process load.

BRIEF DESCRIPTION OF THE DRAWINGS

FIG. 1 shows the concept of a feature point;
FIG. 6 is an explanatory view of losing a feature point;
FIG. 8 shows the concept of generating an expectation value map;
FIG. 9 is an explanatory view (1) of a method of generating an expectation value map;
FIG. 12 is an explanatory view (4) of a method of generating an expectation value map;
FIG. 16 shows the concept of dividing an image into blocks;
FIG. 18 is a flowchart (1) of associating the feature points between the images of a moving subject;
FIG. 20 is an explanatory view of an expanding process.

DESCRIPTION OF THE PREFERRED EMBODIMENTS

Figure 2:
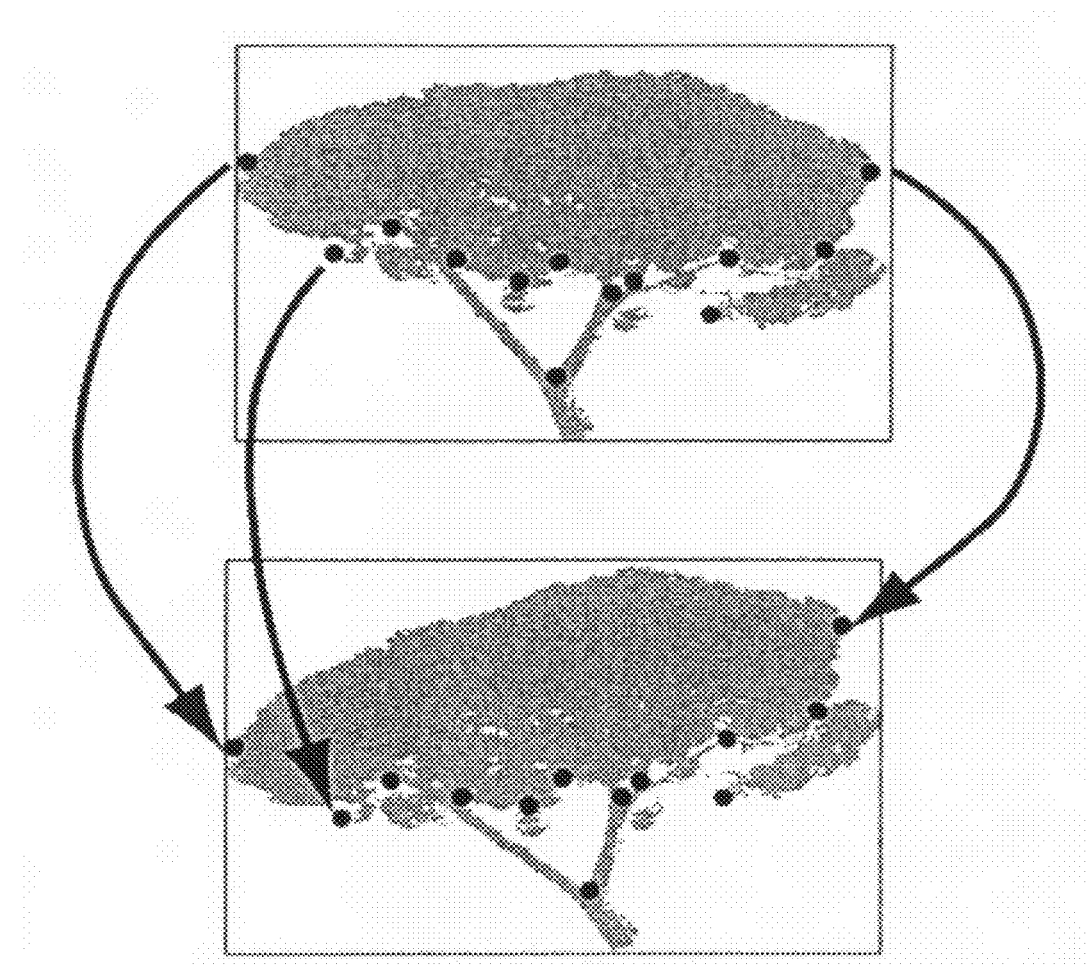
FIG. 2 shows the concept of superposing images one on the other.
Figure 3:
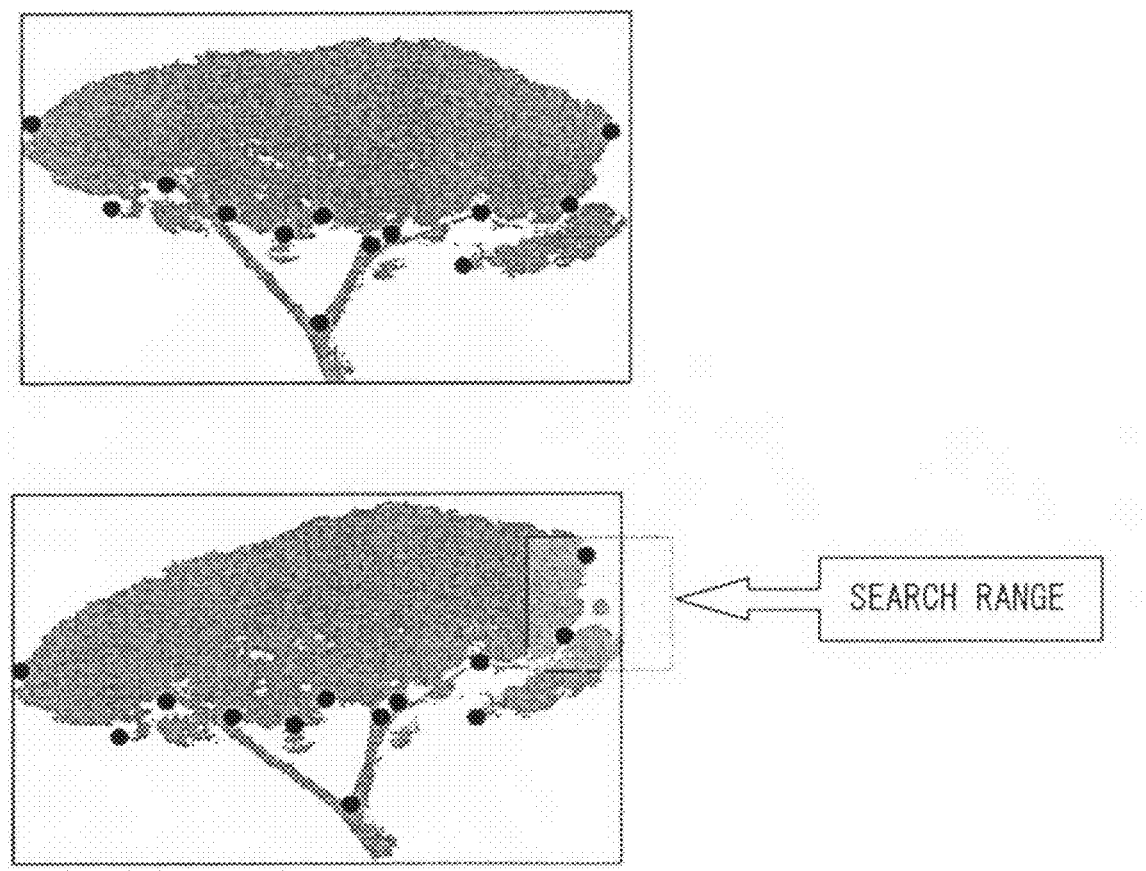
FIG. 3 shows the concept of the correspondence between the feature points.
Figure 4:
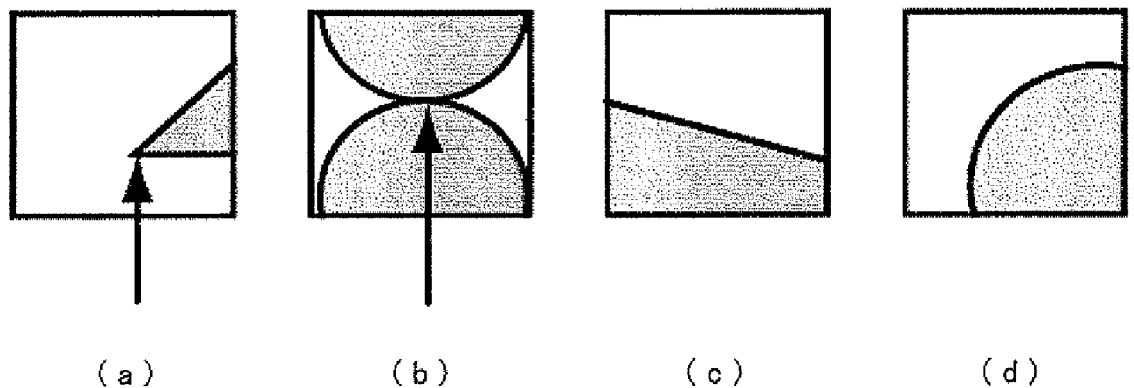
FIG. 4 is an explanatory view of a feature point.

The basic configuration of a mode for embodying the present invention is described below with reference to FIG. 6.

In the method (prior art 1) of extracting a feature point of a reduced image from an original image of high resolution, it is possible that a feature point extracted with high resolution (FIG. 6(a)) is not a feature point of a reduced image (FIG. 6(b)). In the method (prior art 2) of extracting a feature point from a reduced image, it is also possible that a feature point extracted with low resolution (FIG. 6(c)) is not a feature point when the resolution is raised (FIG. 6(d)). When a feature point is lost, there are an increasing number of correspondence errors, and there occurs the problem that it takes a long time to remove the correspondence errors. When the process is performed in aligning images, there is the possibility that the accuracy is degraded by the decreasing number of feature points.

The present mode for embodying the invention provides a device for guaranteeing the presence of a feature point in an original image and a reduced image. Practically, an expectation value map corresponding to the resolution for extraction of a feature point is generated from an image of higher resolution. Thus, the problem of a lower processing speed and reduced accuracy by a lost feature point due to the hierarchy of multi-pixel images can be solved.

With an increasing number of pixels in an image, the computational complexity increases in generating an expectation value map. Therefore, the mode for embodying the present invention provides a device for generating an expectation value map at a high speed. Practically, an expectation value map is generated in a limited characteristic portion in an image of low resolution. Thus, the problem of prolonged time in generating an expectation value map can be solved even for a multi-pixel image.

In addition, for example, when noise is corrected by superposing a plurality of images, the alignment between a plurality of high-accuracy images is required. By calculating the displacement from corresponding feature point information, the images can be aligned at a high speed. When an image partially includes a movement area and a feature point is extracted and traced in the area, the correspondence of the feature points in the movement area can be removed as correspondence error using RANSAC etc. However, when the amount of movement to be removed as a correspondence error is small, it is possible that the correspondence of a no-movement area is defined also as a correspondence error. When the amount of movement is large, there is the possibility that the correspondence of the movement area cannot be removed. Especially, in the case of low movement, it is difficult to remove a feature point on the boundary of the movement area. As a result, the displacement detection accuracy between the images is degraded by the effect of the decrease in number of associated feature points and the correspondence points in the movement areas that cannot be removed.

Therefore, the mode for embodying the present invention provides a device for detecting the displacement after removing the effect of the movement area. Practically, after calculating the displacement without considering the movement area, the movement area is detected and removed from a feature point extraction area, thereby calculating the displacement again. Thus, the problem of the degraded displacement calculation accuracy due to the partial movement of a subject can be solved.

When a movement area of a subject is detected and removed from a feature point extraction area, and a feature point on the boundary of the movement area cannot be removed, the displacement calculation accuracy is degraded. Then, the mode for embodying the present invention provides a device for correctly removing a feature point on the boundary of a movement area. Practically, an expanding process is performed on a detected movement area. Thus, the problem of the degraded displacement calculation accuracy can be solved.

Assume that a partial movement of a subject is detected when the displacement of a plurality of images is obtained. For example, when the subject is captured under a fluorescent light, there is the possibility of the difference in brightness level between the images by the flicker of the fluorescent light. In this case, it is difficult to detect the movement area of a subject although the differences in pixel value are compared between the images.

The mode for embodying the present invention provides a device for easily detecting a movement area. Practically, a process of matching the brightness levels between the images is added. Thus, a movement area can be easily detected when there is a difference in brightness level between the images.

With the above-mentioned configuration, a loss of a feature point or other problems can be solved by generating an expectation value map corresponding to the resolution for extraction of a feature point from an image of higher resolution, and the subjects of the images can be associated at a high speed although the image is a multi-pixel image.

In addition, by generating an expectation value map only relating to a characteristic portion of an image of low resolution, an expectation value map can be generated at a high speed for an image including a number of pixels, thereby furthermore enhancing the processing speed.

Furthermore, the degradation of the displacement calculation accuracy due to a partial movement of a subject can be avoided by calculating the displacement without considering a movement area, detecting a movement area and removing it from a feature point extraction area, and calculating the displacement again. Additionally, by the displacement calculation accuracy can be maintained by correctly removing the feature point on the boundary of the movement area.

Furthermore, although there are differences between the brightness levels of images, the partial movement area of a subject can be easily calculated, and the process can be performed at a high speed.

Figure 5:
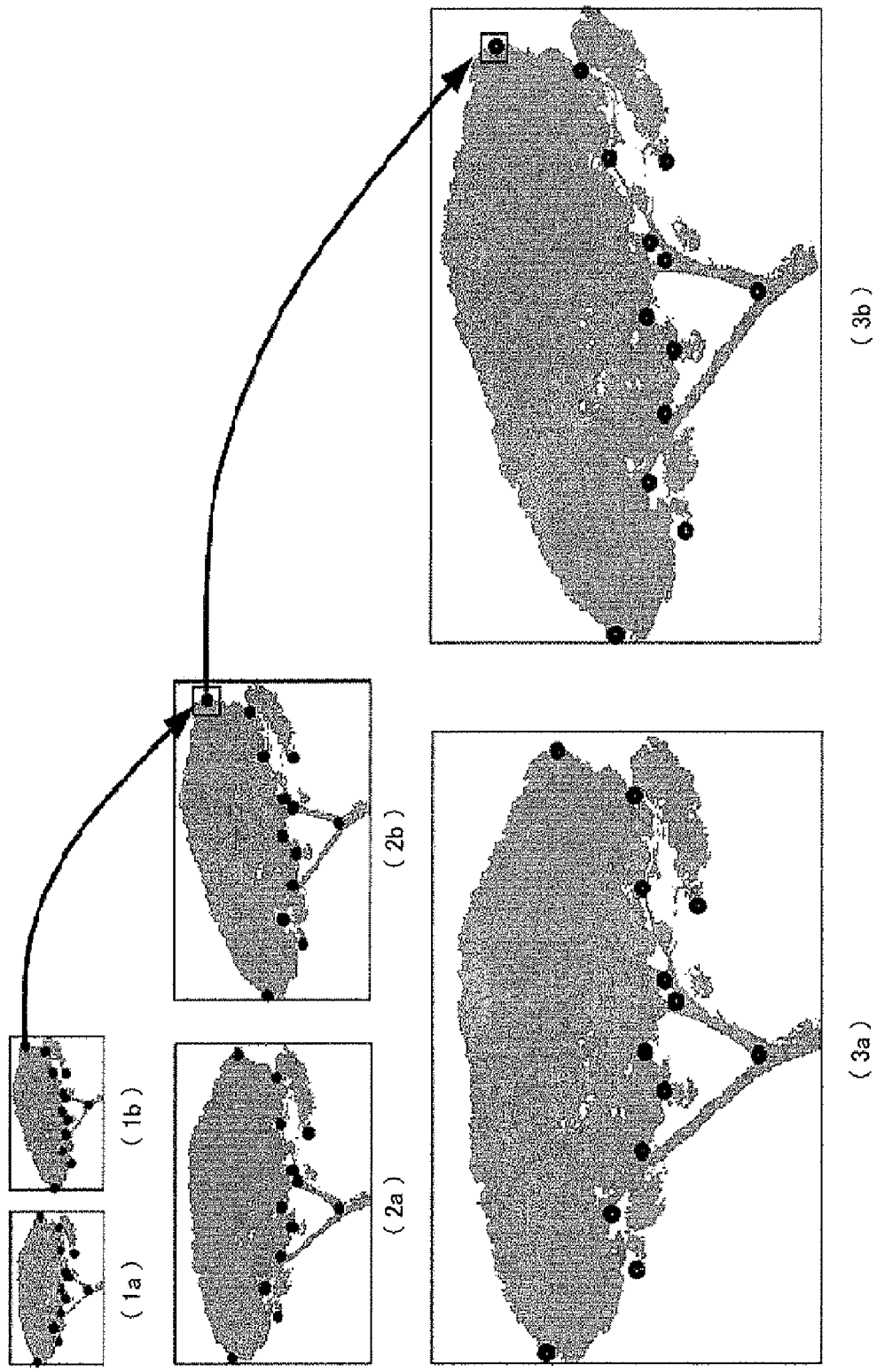
FIG. 5 shows the concept of hierarchical levels of images.

The correspondence between the images as shown by FIG. 1 (a) and FIG. 1 (b) on the basis of the three hierarchical levels (three levels of resolution) as shown in FIG. 5 is described below.

Figure 7:
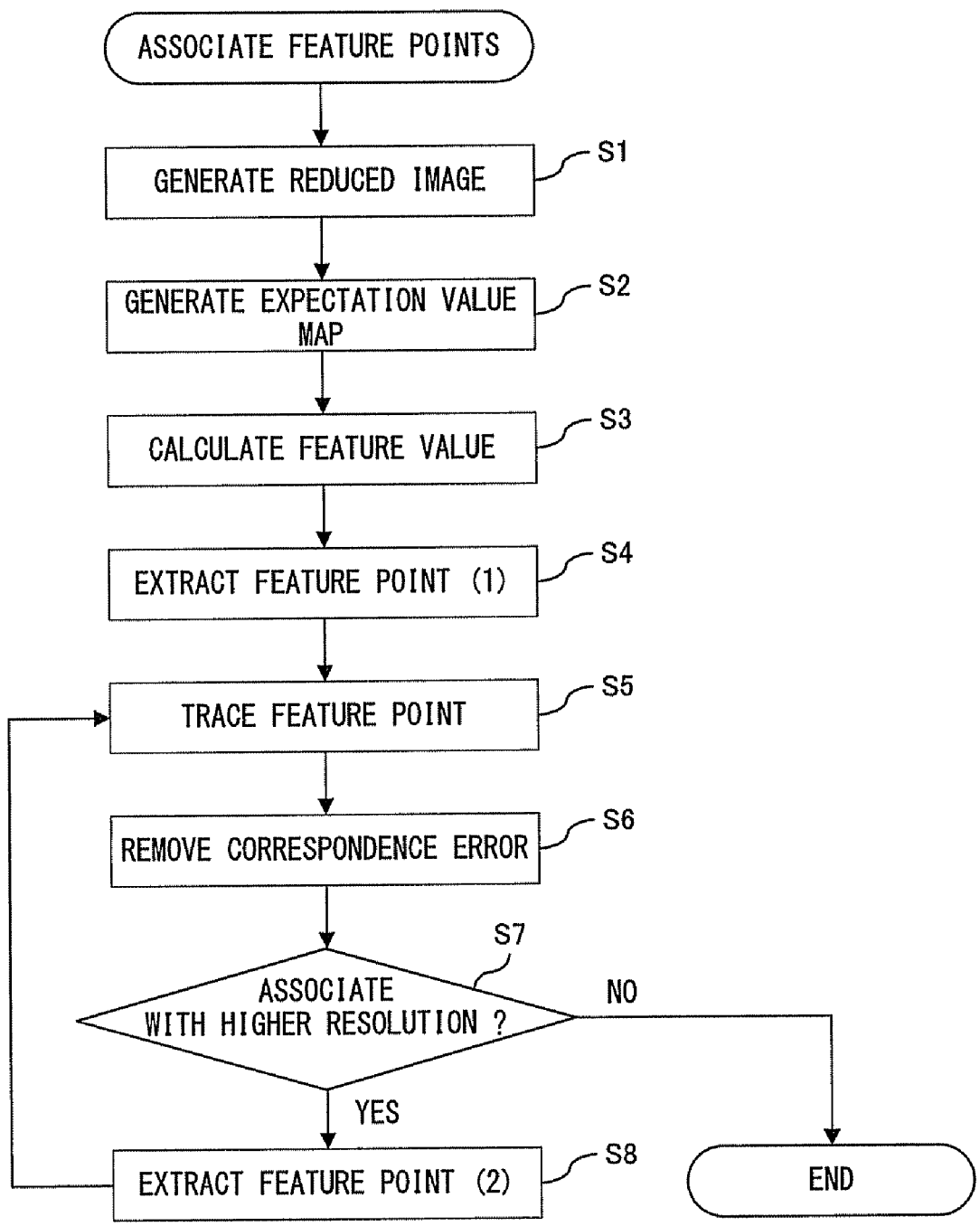
FIG. 7 is a flowchart of associating feature points with each other.

FIGS. 7 and 8 show the outline of the process. First, the outline of the process is described below.

First, reduced images (FIGS. 5 (1a), (1b), (2a), and (2b)) are generated (step S1) and an expectation value map of the same size as the reduced images is generated (step S2). Then, the feature value of the reduced image is calculated (step S3), and a feature point is extracted only from the point of a high expectation value (refer to step S4 shown in FIG. 8). The extracted feature point is traced in the reduced image (FIG. 5 (1b)) to be associated (a corresponding point is detected in step S5). Since a correspondence error can be included in a result of tracing, the correspondence error is removed using RANSAC etc. (step S6). It is determined whether or not images of higher resolution are associated with each other (step S7). If the determination result in step S7 is NO, then the process terminates. If the determination result in step S7 is YES, then the point corresponding to the feature point of FIG. 5(1a) is converted into a point on the image of higher resolution as shown in FIG. 5 (2a), and the feature point is searched for again in the surroundings (step S8). The feature point is traced and a correspondence error is removed repeatedly in FIGS. 5 (2a), (2b), (3a), and (3b).

FIGS. 9 through 12 are explanatory views of a method of generating an expectation value map.

First, a feature value is calculated by a Moravec operator. The Moravec operator is used as the operator in this case, but various other operator can be used. The feature value of each pixel is compared with the feature values of the eight surrounding pixel, and if it is not the maximum value, the feature value is set to 0. The feature value is divided into blocks of the same number as the pixels of the expectation value map, and the maximum value of each block is set as an expectation value. The values other than N higher expectation values are set to 0. FIG. 9 shows an image of an expectation value map. Actually, the expectation value obtained in the above-mentioned process is recorded in each block of the expectation value map.

The problem of a lost feature point can be solved by extracting the feature point traced from the position exceeding an appropriate threshold in the obtained expectation value map.

Figure 10:
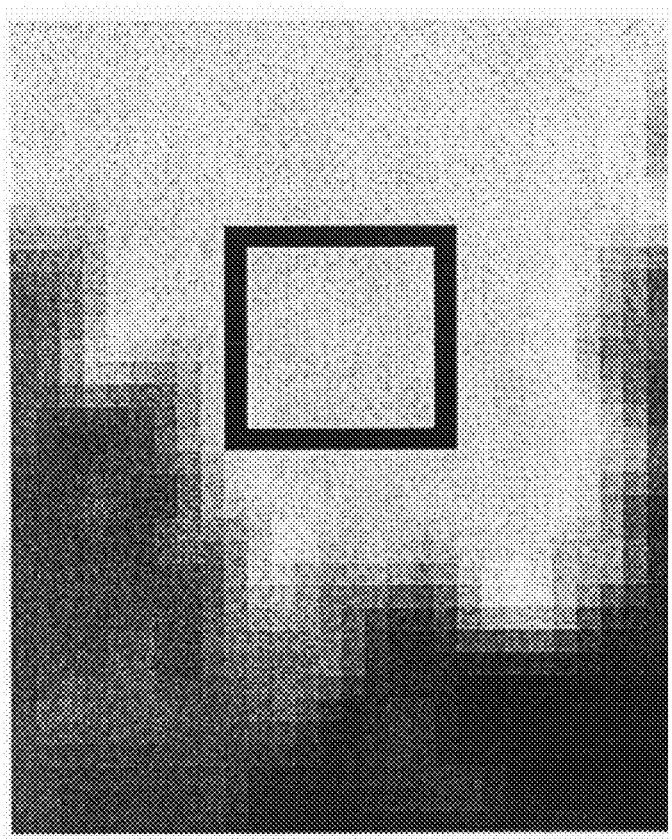
FIG. 10 is an explanatory view (2) of a method of generating an expectation value map.
Figure 11:
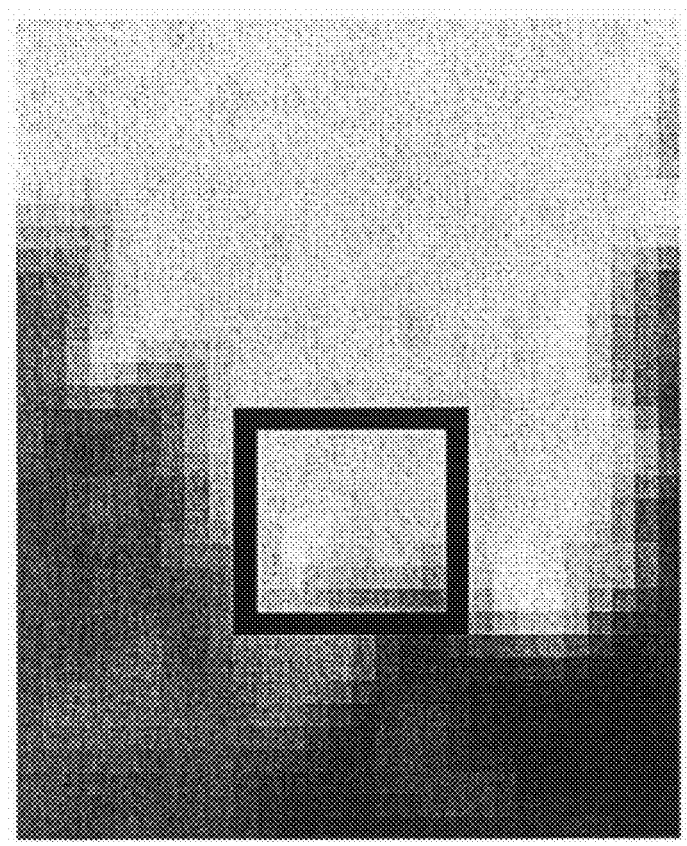
FIG. 11 is an explanatory view (3) of a method of generating an expectation value map.

FIGS. 10 and 11 exemplify results of the case where a feature point is extracted without using the expectation value map and the case where a feature point is extracted using the expectation value map. When the expectation value map is not used as shown in FIG. 10, the position of the square indicating the position of the feature point falls at a point not indicating a feature point in the reduced image. On the other hand, when the expectation value map is used as shown in FIG. 11, the position of the square indicating the location of the feature point falls at the feature point in the reduced image.

FIG. 12 is an explanatory view of Moravec operator.

With regard to the window shown in FIG. 12, the following equation indicates the feature point of the position of $I_{0,0}$.

$$\min \sum_{j=-2}^{2} (I_{i,j} - I_{0,0})^2 (i = 0, 1, 2, 3)$$

Furthermore, if it is not a maximum value when it is compared with the feature points of the eight surrounding feature points, the result of the calculation using the point as 0 is defined as the output of the operator.

Figure 13:
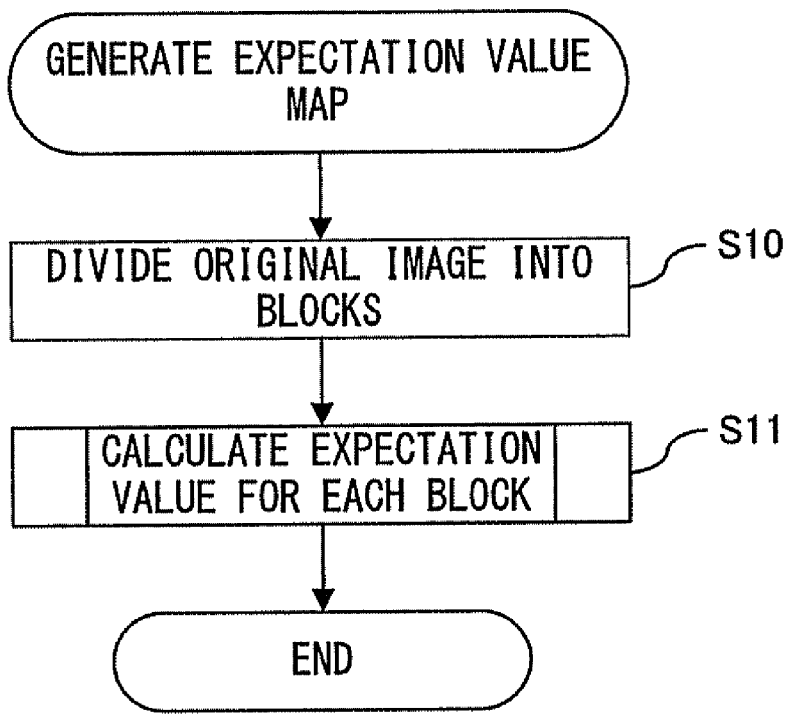
FIG. 13 is a flowchart (1) of generating an expectation value map.
Figure 14:
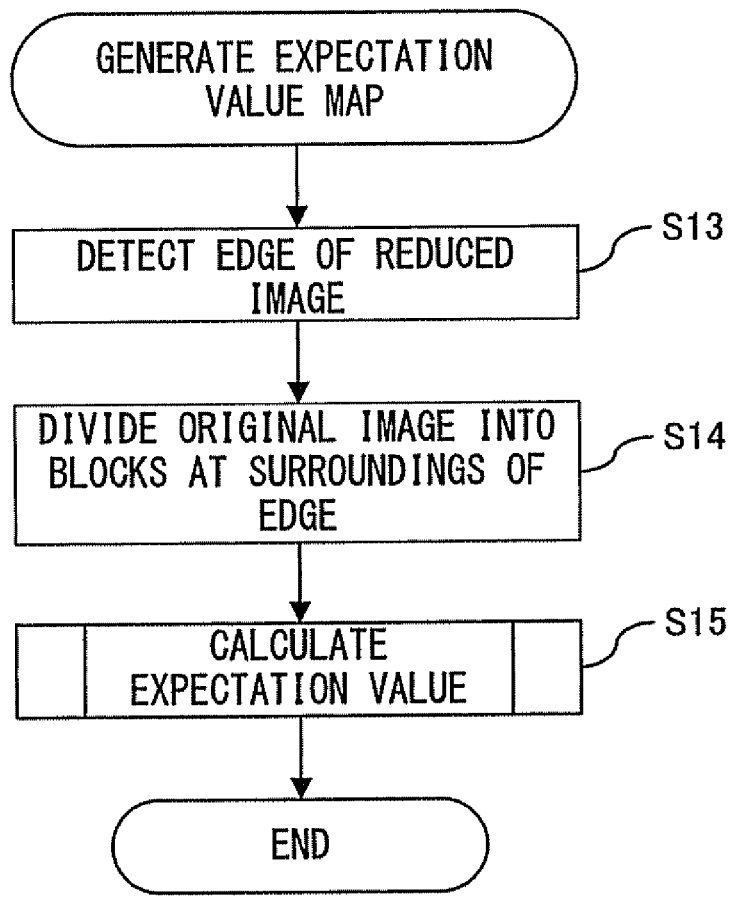
FIG. 14 is a flowchart (2) of generating an expectation value map.

FIGS. 13 through 16 are explanatory views of the expectation value map generating method. FIGS. 13 and 14 correspond to the respective generating methods.

First, the process shown in FIG. 13 is described.

The original image shown in FIG. 5 (3a) is divided into the same number of blocks as the pixels of the reduced image shown in FIG. 5 (1a) (step S10). For example, assume that the reduction ratio of the reduced image shown in FIG. 5 (1a) is ¼ vertically and horizontally. In this case, the original image shown in FIG. 5 (3a) is to be divided into blocks of 4 pixels vertically and horizontally (process 1 shown in 8a and FIG. 16(a)). The expectation value of the feature point of a block is the maximum value obtained after comparing the feature points of the pixels in a block (step S11). In calculating a feature point, the operator such as the above-mentioned KLT, Moravec, Harris, SUSAN, etc. can be used. In extracting a feature point, the KLT is used, and in calculating an expectation value, Moravec that requires lower computational complexity is used. Thus, different operator can be used. When different operators are used, it is desired that there is a superposing area between adjacent blocks as shown in FIG. 16 (b). When an operator requiring high computational complexity such as the KLT is used, the presence/absence of edges is determined in advance as shown in FIG. 15, and the expectation value can be 0 when there are a small number of edges.

Described below is the process shown in FIG. 14. Since the portion including no edge in a reduced image is not extracted as a feature point in step S4 shown in FIG. 7, the calculation of an expectation value can be omitted for the portion. Then, before performing the process shown in FIG. 13, the process of detecting an edge of a reduced image is performed. In FIG. 13, the presence/absence of an edge is calculated using an original image. Since it is calculated using a reduced image in FIG. 14, the process can be performed at a high speed. That is, an edge of a reduced image is detected in step S13, an original image is divided into blocks around the edge in step S14, and an expectation value is calculated for each block in step S15.

Figure 15:
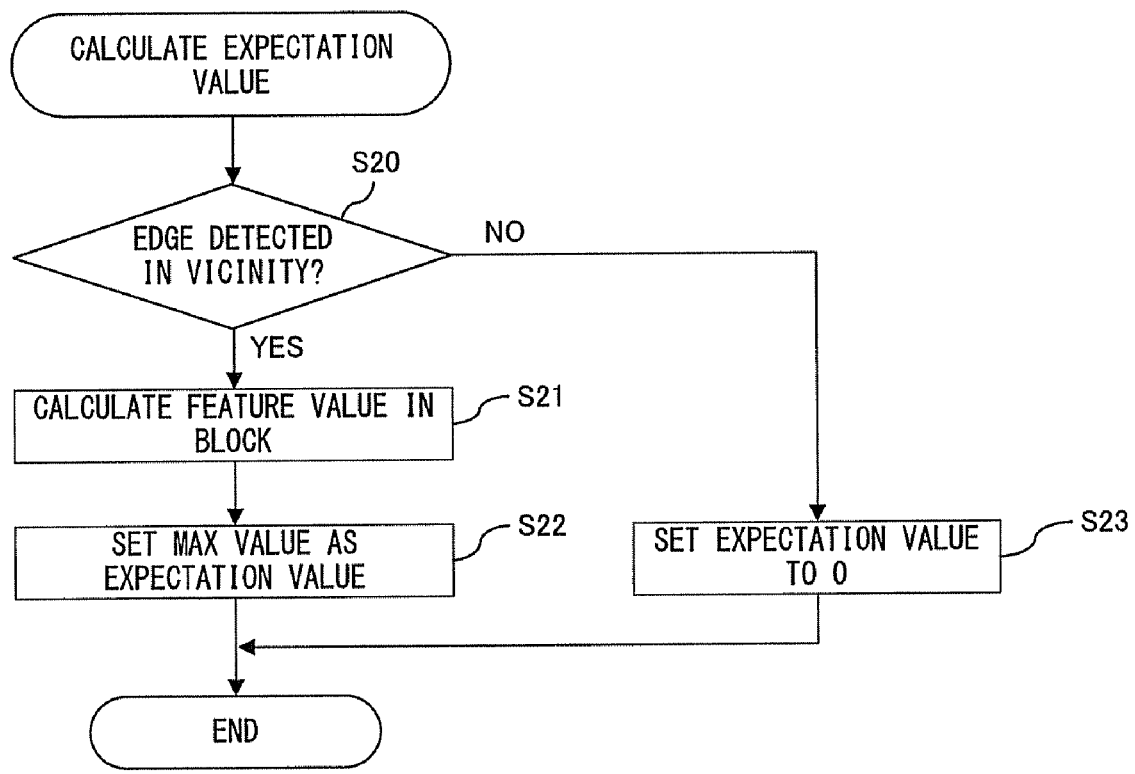
FIG. 15 is a flowchart of calculating an expectation value.

In the expectation value calculating process shown in FIG. 15, it is determined in step S20 whether or not there is an edge detected in the vicinity. If the determination in s S20 is NO, the expectation value of the block is set to 0 in step S23. If the determination in step S20 is YES, then the feature value in the block is calculated in step S21, and the maximum value in the block is set as the expectation value of the block in step S22, thereby terminating the process.

It is not necessary to simultaneously generate the reduced images (FIGS. 5 (1a), (1b), (2a), (2b)), but the images can be generated at any necessary stage. The process can be performed at a higher speed if the feature values of the reduced images at only the surroundings of a point indicating a high expectation value are calculated. Although it is not essential to search again for a feature point in step S7 shown in FIG. 7, the accuracy can be degraded without the search. It is not necessarily essential to generate an expectation value map from an original image, and the expectation value map for FIG. 5 (3a) can be generated from FIG. 5 (2a). Furthermore, although no superposing area is generated for a block of four pixels vertically and horizontally in step S10 shown in FIG. 13, a width of four or more pixels can be accepted.

Figure 19:
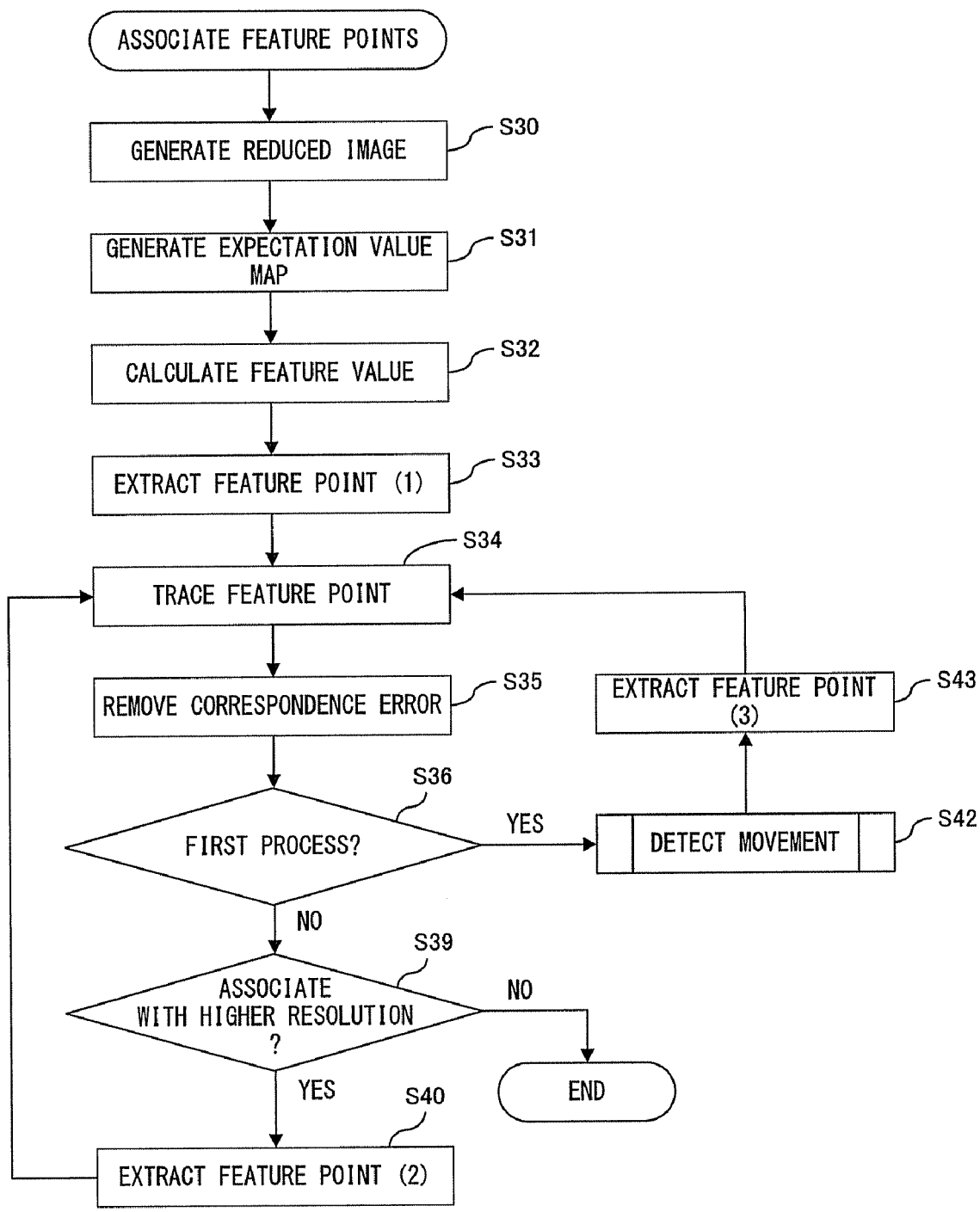
FIG. 19 is a flowchart (2) of associating the feature points between the images of a moving subject.

FIGS. 18 and 19 are flowcharts of different methods for a process of associating feature points.

Figure 17:
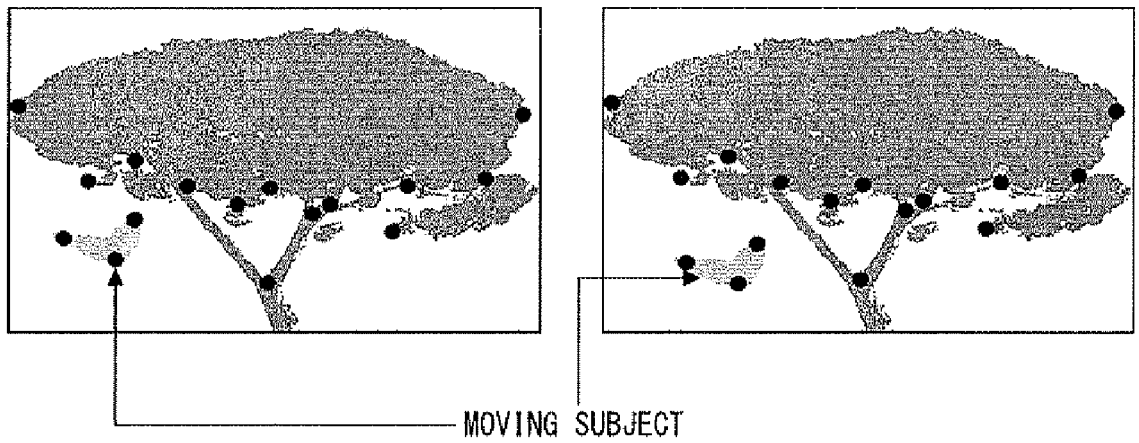
FIG. 17 is an explanatory view of the correspondence between the images of a moving subject.

As shown in FIG. 17, it is desired that no feature point is extracted from a movement portion if a subject partially includes the movement portion. In the first process performed on a reduced image as shown in the flowchart of FIG. 18, a movement is detected (step S37 shown in FIG. 18), a feature point in the movement area is removed (step S38 shown in FIG. 18), and control is returned to the process (2) of extracting a feature point (step S40 shown in FIG. 18). In this case, it is desired that the number larger than a required number of candidates for feature points are extracted to use a corresponding point from which a movement area is removed.

As shown in the flowchart of FIG. 19, a feature point can be extracted again from an image from which the movement area has been removed.

In the method of associating feature points shown in FIG. 18, a reduced image is generated in step S30, an expectation value map is generated in step S31, and a feature value is calculated in step S32. Then, in step S33, a feature point is extracted using an expectation value map in the method above. A feature point is traced in step S34, and a correspondence error between the feature point of an original image and the feature point of a reduced image is removed in step S35. It is determined in step S36 whether or not the current process is the first process. If the determined in step S36 is YES, a movement is detected in step S37, a movement area is removed in step S38, and control is passed to step S40. If the determination in step S36 is NO, it is determined in step S39 whether or not the feature points are associated with each other using high resolution images. If the determination in step S39 is NO, the process terminates. If the determination in step S39 is YES, a feature point is extracted again with the higher resolution in step S40. After step S40, control is passed to step S34, and the processes are repeated up to a target resolution.

In FIG. 19, the process also shown in FIG. 18 is assigned the same step number, and the description is omitted here. The difference from the process shown in FIG. 18 is that, if the determination in step S36 is YES, a movement is detected in step S42, and after removing or masking the movement area, a feature point is newly extracted in step S43. After step S43, control is returned to step S34, and the processes are repeated.

It is easy to extract a movement area by superposing FIG. 5 (1b) on FIG. 5 (1a) from the information about the first obtained corresponding points, and extracting a point including one or both of the brightness difference and the color difference exceeding an appropriate threshold. However, when there is a feature point at the boundary of a movement area, there is the possibility that some thresholds can be classified as non-movement areas, it is desired to perform an expanding process on an extracted movement area.

When there is a difference in brightness level between the images shown in FIGS. 5 (1b) and (1a), it is hard to extract a movement area from a brightness difference and a color difference. However, a movement area can be easily extracted by performing a histogram conversion such that the brightness levels of the images can match each other.

Described below is the method of superposing image.

First, a feature point $\{P_i\}$ is extracted from the image P, and the image Q is searched for a corresponding point $\{q_i\}$. Next, a matrix satisfying $q_i=HP_i$ is obtained for the $n \geq 4$ associated points $\{p_i \Leftrightarrow q_i\}$.

When image Q and image P are superposed, the pixel value of the point $q_i=Hp_i$ on the image Q which corresponds to the point $p_i=\{x_{pi}, y_{pi}, 1\}^T$ on the image P is obtained by interpolation, and superposed on the image P.

However, $p_i$ and $q_i$ are represented by homogeneous coordinates such as $p_i=\{x_{pi}, y_{pi}, 1\}^T$, $q_i=\{x_{qi}, y_{qi}, 1\}^T$.

[Method of Obtaining a Matrix H]

(1) $p_i$, $q_i$ are converted as follows.

$$p_{mean} = \frac{1}{N}\sum_{i=1}^{n} p_i, \quad q_{mean} = \frac{1}{N}\sum_{i=1}^{n} q_i$$

$$p_{dist} = \frac{1}{N}\sum_{i=1}^{n} |p_i - p_{mean}|, \quad q_{dist} = \frac{1}{N}\sum_{i=1}^{n} |q_i - q_{mean}|$$

$$p_i = \frac{\sqrt{2}}{p_{dist}}(p_i - p_{mean}), \quad q_i = \frac{\sqrt{2}}{q_{dist}}(q_i - q_{mean})$$

(2) The matrix H satisfying $q_i=Hp_i$ is obtained for H as follows.

$$A_i = \begin{pmatrix} 0^T & -p_i^T & q_{yi}p_i^T \\ p_i^T & 0^T & -q_{xi}p_i^T \end{pmatrix}$$

$$A = (A_1^T \ A_2^T \ \ldots \ A_n^T)^T$$

(Ai is a Matrix of Two Rows by Nine Columns)

(A is a matrix of 2n rows by nine columns obtained by arranging Ai in the row direction)

→$A=UDV^T$ (Singular value analysis in which D is arranged in order from larger values)

$H=(h_1 \ h_2 \ h_3)$ (H is a matrix of three rows by three columns.)

However, h is the last column of V represented by $h=(h_1^T h_2^T h_3^T)^T$ (3) $H=T_q^{-1}HT_p$ where $T_p$, $T_q$ are represented by the following matrix.

$$T_p = \begin{pmatrix} \frac{\sqrt{2}}{p_{dist}} & 0 & -\frac{\sqrt{2}}{p_{dist}}p_{mean\_x} \\ 0 & \frac{\sqrt{2}}{p_{dist}} & -\frac{\sqrt{2}}{p_{dist}}p_{mean\_y} \\ 0 & 0 & 1 \end{pmatrix},$$

-continued $$T_q = \begin{pmatrix} \frac{\sqrt{2}}{q_{dist}} & 0 & -\frac{\sqrt{2}}{q_{dist}} q_{mean\_x} \\ 0 & \frac{\sqrt{2}}{q_{dist}} & -\frac{\sqrt{2}}{q_{dist}} q_{mean\_y} \\ 0 & 0 & 1 \end{pmatrix}$$

Described below is a correspondence error point removing method (RANSAC for nomography).

The point (outlier) of $t^2 \leq d_{err}^2$ in the process (4) below is removed as a correspondence error point.

(1) The associated points $\{p_i \Leftrightarrow q_i\}$ are converted into $\{p_i \Leftrightarrow q_i\}$, $T_p$, $T_q$. Refer to the description above for the conversion method.

(2) Four points are extracted at random from $\{p_i \Leftrightarrow q_i\}$. However, when further three points are extracted from the four points, any combination to set the three points on the same line is to be eliminated.

(3) Homography:H is obtained from the four extracted points.

(4) The point represented by $d_{err}^2=|p_i-H_s^{-1}q_i|^2+|q_i-H_s p_i|^2 < t^2$ is set as an inlier.

(5) If the following equation is not satisfied for the iteration number of N: (2) to (4), and the number of n:inlier, control is returned to (2).

$$\frac{\log(1-p)}{\log(1-(n_i/n)^4)} \leq N$$

(6) The Homography:H is obtained again from all inliers in $\{p_i \Leftrightarrow q_i\}$.

(7) The Homography:H=$T_q^{-1}$HT is obtained for $\{p_i \Leftrightarrow q_i\}$.

Next, the expanding process is described. FIG. 20 is an explanatory view of the expanding process.

When the portion determined as a movement area is represented by white, the black point is regarded, and if there are no white points in the eight surrounding areas, leave the point as is (FIG. 20(a)). If there is a white point, then turn it into white (FIG. 20(b)). For example, the mask as shown on the left of FIG. 20(c) is converted into what is represented on the right of FIG. 20(c). However, for comprehensibility, the white portion before the expanding process is represented by diagonal lines.

Described below is a white portion before expansion.

Next, a histogram conversion is described.

When the image 2 is converted into the brightness level of the image 1, the following process is performed.

(1) A simple difference between the image 1 and the image 2 is obtained to extract an area below an appropriate threshold.

(2) In the area extracted in (1) above, a standard deviation $S_1$, an average value $y_1$, a standard deviation $S_2$ of the pixel value of the image 2, and an average value $v_2$ are obtained.

(3) The pixel value y of the image 2 is converted into Y in the following equation.

$$Y = \frac{S_1}{S_2}(y - y_2) + y_1$$

An apparatus according to the embodiment can be realized by a computer executing a program functioning as each unit of the image processing apparatus.

What is claimed is:

1. An image processing apparatus which combines two images by superposing one on another, comprising:
    a reduced image generation unit configured to generate reduced images from original images to be superposed one on the other;
    an expectation value map generation unit configured to calculate feature values for each pixel of an original image of an image to be superposed, using a certain operator filter operating on pixels of the original images, to divide feature values of each pixel into blocks corresponding to the resolution of the reduced image, and to generate an expectation value map in which an expectation value of a feature value is registered;
    a feature point extraction unit configured to extract a feature point from the expectation value registered in the expectation value map; and
    a superposition unit configured to superpose one of a plurality of reduced images of original images to be superposed on another of the plurality of reduced images using the feature points, to extract a feature point in an original image corresponding to the feature point from a result of the superposition, and to superpose the original images one on the other, wherein
    the feature point extraction unit removes an area in which it is determined that an object in an image is moving, and a feature point is extracted.

2. The apparatus according to claim 1, wherein
    the reduced images are generated for a plurality of resolutions, the reduced images of lowest resolution are superposed with each other, the reduced images of sequentially higher resolution are superposed with each other, and the original images are finally superposed with each other.

3. The apparatus according to claim 1, wherein
    the expectation value is calculated only for a portion including an edge of an image.

4. The apparatus according to claim 1, wherein
    an expectation value for a portion including no edge of an image is set to 0.

5. The apparatus according to claim 1, wherein
    after matching brightness levels of two images to be superposed one on another, a superposing process is performed.

6. The apparatus according to claim 1, wherein
    an area obtained by performing an expanding process on an area in which the object moves is removed from an area for use in the process.

7. The image processing apparatus according to claim 1, wherein
    the operator filter is made of a Moravec operator.

8. An image processing method of combining two images by superposing one on another, comprising:
    generating reduced images from original images to be superposed one on the other;
    calculating feature values for each pixel of an original image of an image to be superposed, using a certain operator filter operating on pixels of the original images, dividing feature values of each pixel into blocks corresponding to the resolution of the reduced image, and generating an expectation value map in which an expectation value of a feature value is registered;
    extracting a feature point from the expectation value registered in the expectation value map; and superposing one of a plurality of reduced images of original images to be superposed on another of the plurality of reduced images using the feature points, extracting a feature point in an original image corresponding to the feature point from a result of the superposition, and superposing the original images one on the other, wherein the feature point extraction step removes an area in which it is determined that an object in an image is moving, and a feature point is extracted.

9. The method according to claim 8, wherein the reduced images are generated for a plurality of resolutions, the reduced images of lowest resolution are superposed with each other, the reduced images of sequentially higher resolution are superposed with each other, and the original images are finally superposed with each other.

10. The method according to claim 8, wherein the expectation value is calculated only for a portion including an edge of an image.

11. The method according to claim 8, wherein an expectation value for a portion including no edge of an image is set to 0.

12. The method according to claim 8, wherein after matching brightness levels of two images to be superposed one on another, a superposing process is performed.

13. The method according to claim 8, wherein an area obtained by performing an expanding process on an area in which the object moves is removed from an area for use in the process.

14. A non-transitory computer-readable medium storing a computer program used to direct a computer to realize an image processing method of combining two images by superposing one on another, comprising the steps of:

generating reduced images from original images to be superposed one on the other;

calculating feature values for each pixel of an original image of an image to be superposed, using a certain operator filter operating on pixels of the original images, dividing feature values of each pixel into blocks corresponding to the resolution of the reduced image, and generating an expectation value map in which an expectation value of a feature value is registered;

extracting a feature point from the expectation value registered in the expectation value map; and superposing one of a plurality of reduced images of original images to be superposed on another of the plurality of the reduced images using the feature points, extracting a feature point in an original image corresponding to the feature point from a result of the superposition, and superposing the original images one on the other, wherein the feature point extraction step removes an area in which it is determined that an object in an image is moving, and a feature point is extracted.

15. The medium according to claim 14, wherein the reduced images are generated for a plurality of resolutions, the reduced images of lowest resolution are superposed with each other, the reduced images of sequentially higher resolution are superposed with each other, and the original images are finally superposed with each other.

16. The medium according to claim 14, wherein the expectation value is calculated only for a portion including an edge of an image.

17. The medium according to claim 14, wherein an expectation value for a portion including no edge of an image is set to 0.

18. The medium according to claim 14, wherein after matching brightness levels of two images to be superposed one on another, a superposing process is performed.

19. The medium according to claim 14, wherein an area obtained by performing an expanding process on an area in which the object moves is removed from an area for use in the process.

* * * * *